US007769113B2

(12) United States Patent
Poloni et al.

(10) Patent No.: US 7,769,113 B2
(45) Date of Patent: Aug. 3, 2010

(54) METHOD AND APPARATUS FOR CHANNEL ESTIMATION OF TRANSMISSION CHANNELS WITH MEMORY IN DIGITAL TELECOMMUNICATIONS SYSTEMS, AND CORRESPONDING COMPUTER-PROGRAM PRODUCT

(75) Inventors: Angelo Poloni, Fino del Monte (IT); Filippo Silva, Castellanza (IT); Stefano Valle, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1195 days.

(21) Appl. No.: 11/313,244

(22) Filed: Dec. 20, 2005

(65) Prior Publication Data

US 2006/0159203 A1    Jul. 20, 2006

(30) Foreign Application Priority Data

Dec. 21, 2004   (EP)   ................................. 04425933

(51) Int. Cl.
*H04L 27/06* (2006.01)
(52) U.S. Cl. ...................................................... 375/340
(58) Field of Classification Search ................. 375/150, 375/260, 340, 342–343; 370/208, 210, 335, 370/423
See application file for complete search history.

(56) References Cited

U.S. PATENT DOCUMENTS

| 6,658,045 | B1 * | 12/2003 | Jin | 375/147 |
| 7,058,144 | B2 * | 6/2006 | Baldwin | 375/346 |
| 7,139,321 | B2 * | 11/2006 | Giannakis et al. | 375/260 |
| 2003/0026360 | A1 * | 2/2003 | Ramasubramanian et al. | 375/343 |
| 2006/0239364 | A1 * | 10/2006 | Wilhelmsson | 375/260 |
| 2007/0047670 | A1 * | 3/2007 | Chen | 375/316 |
| 2008/0056181 | A1 * | 3/2008 | Imamura et al. | 370/329 |

OTHER PUBLICATIONS

Valle, S., "Doppler Spread Measurements for Tuning Pilot-Assisted Channel Estimation," in *Proceedings of the 3rd IEEE Int'l Symposium on Signal Processing and Information Technology*, Darmstadt, Germany, Dec. 14-17, 2003, pp. 403-406.

(Continued)

*Primary Examiner*—Khanh C Tran
(74) *Attorney, Agent, or Firm*—Lisa K. Jorgenson; Jeremiah J. Baunach; Seed IP Law Group PLLC (57) ABSTRACT

In order to execute, as a function of a received signal (r), a procedure of channel estimation in a transmission channel with memory in a telecommunications system, there is envisaged an operation of estimation of a delay spread associated to said channel, said operation of estimation comprising calculation of a root mean square value ($\tau_{rms}$) of delay spread by means of a step of evaluation of crossings with a threshold level of a quantity associated to a transfer function of said channel. Said step of evaluation of crossings comprises evaluating a mean number of crossings ($\lambda_0$) of the real and imaginary parts of said channel transfer function with a threshold level corresponding to the zero level. Example application is to OFDM telecommunications systems and in particular wireless systems according to the IEEE 802.11a WLAN standard or the HyperlanII WLAN standard.

19 Claims, 3 Drawing Sheets

OTHER PUBLICATIONS

Witrisal, K., et al., "A New Method to Measure Parameters of Frequency-Selective Radio Channels Using Power Measurements," *IEEE Trans. On Comm.*, 49(10):1788-1800, Oct. 2001.

Witrisal, K., et al., "Influence of Noise on a Novel RMS Delay Spread Estimation Method," in *Proceedings of the 11th IEEE Int'l. Symposium on Personal, Indoor and Mobile Radio Communications*, Piscataway, NJ, Sep. 18-21, 2000, pp. 560-566.

Edfors et al., "OFDM Channel Estimation by Singular Value Decomposition," In Proceedings of Vehicular Technology Conference (VTC '96), pp. 923-927, Atlanta, USA, Apr. 1996.

Simeone et al., "Pilot-Based Channel Estimation for OFDM Systems by Tracking the Delay-Subspace," IEEE Transactions on Wireless Communications, 3(1):315-325, Jan. 2004.

Wu and Bar-Ness, "OFDM Channel Estimation in the Presence of Frequency Offset and Phase Noise," IEEE International Conference on Communications (ICC '03), 5:3366-3370, May 11-15, 2003.

Papoulis, A., "Probability, Random Variables and Stochastic Processes," McGraw-Hill, Third Edition, Feb. 1, 1991.

Witrisal, "On Estimating the RMS Delay Spread from the Frequency-Domain Level Crossing Rate," IEEE Communications Letters, 5(7):287-289, Jul. 2001.

\* cited by examiner

METHOD AND APPARATUS FOR CHANNEL ESTIMATION OF TRANSMISSION CHANNELS WITH MEMORY IN DIGITAL TELECOMMUNICATIONS SYSTEMS, AND CORRESPONDING COMPUTER-PROGRAM PRODUCT

TECHNICAL FIELD

The present disclosure generally relates to telecommunications techniques and has been developed with particular but not exclusive attention paid to its possible application to digital telecommunications systems based upon a modulation of an orthogonal frequency-division multiplexing (OFDM) type.

Although in what follows, for reasons of clarity and simplicity of exposition, almost exclusive reference will be made to this application, it is in any case to be borne in mind that the scope of this disclosure is more general. The disclosure is in fact applicable to all telecommunications systems in which there occur conditions of operation of the same type as the ones described in what follows.

BACKGROUND INFORMATION

In digital telecommunications systems and in particular in telecommunications systems of a wireless type, there are often encountered transmission channels with memory. Said transmission channels with memory bring about a spread in time of the transmitted signal. In the frequency domain, said phenomenon produces the so-called frequency selectivity. It is crucial in these cases to know the amount of said spread, which is often characterized by a so-called delay-spread time. The knowledge of the delay spread enables among other things adaptive calibration of the channel-estimation algorithms. Said algorithms must estimate a number of parameters proportional to the delay spread. In the case where this is unknown, the channel estimators must be parameterized in a conservative way, e.g., presupposing always having the maximum delay spread that can be supported by the system. Said assumption has as an effect a reduction in the overall performance of the system.

In greater detail, a transmission channel with memory is characterized by an impulse response $h(\tau)$ of the type:

$$h(\tau) = \sum_{i=0}^{L-1} h_i \cdot \delta(\tau - \tau_i) \qquad (1)$$

where $h_i$ indicates a complex number (which is possibly time variant) that represents a gain applied to the replica of the received signal with a delay $t_i$, and L represents the number of distinguishable replicas. The gains $h_i$ are complex Gaussian random variables with zero mean. In some cases the gain $h_0$ can have a mean other than zero. Said channels are referred to as Rice channels.

A corresponding transfer function $H(f)$ of the impulse response $h(\tau)$ of the transmission channel with memory is obtained by applying the Fourier transform:

$$H(f) = \int_{-\infty}^{+\infty} h(\tau) \cdot e^{-j2\pi f \tau} d\tau = \sum_{i=0}^{L-1} h_i \cdot e^{-j2\pi f \tau_i} d\tau \qquad (2)$$

A power delay profile (PDP), $P(\tau)$, is defined as:

$$P(\tau) = \sum_{i=0}^{L-1} E[|h_i^2|] \cdot \delta(\tau - \tau_i) \qquad (3)$$

where for reasons of simplicity $$\sum_{i=0}^{L-1} E[|h_i^2|] = 1.$$

Defined as mean square deviation of the delay spread, or root mean square delay spread (RMS-DS) and designated by $\tau_{rms}$ is the following quantity:

$$\tau_{rms} = \sqrt{\sum_i |h_i|^2 \tau_i^2 - \left(\sum_i (|h_i|^2 \cdot \tau_i)\right)^2} \qquad (4)$$

The RMS-DS $\tau_{rms}$ provides a quantitative measurement of the degree of delay spread produced by the channel. Its inverse provides, instead, a measurement of the coherence band of the channel itself. This represents the bandwidth that incurs the same type of distortion by the channel. It is evident that the greater the dispersion of the channel the smaller will be the coherence band and consequently the more the channel will be selective in frequency.

The knowledge of the RMS-DS $\tau_{rms}$ hence indirectly provides a tool for selecting the unknown parameters of the impulse response $h(\tau)$ or of its transform $H(f)$; for example, assuming a delay profile $P(\tau)$ of an exponential type it is possible to obtain an estimation of the maximum significant delay $t_{L-1}$.

Among the solutions known in the state of the art, the most common method for parameter estimation in OFDM systems is the one proposed in the publication O. Edfors, M. Sandell, J. van de Beek, S. K. Wilson, P. Berjesson, "*OFDM Channel Estimation by singular value decomposition*", IEEE Transactions on Communications, vol. 46, No. 7 July 1998, where in particular singular-value decomposition of the correlation matrix of the channel frequency response is used. In this case, the computational cost is significant. Likewise, in O. Simeone, Y. Bar-Ness, U. Spagnolini, "*Subspace-tracking methods for channel estimation in OFDM systems*", IEEE Transactions on Wireless Communications, vol. 3, no. 1, January, 2004, estimation of the rank of the correlation matrix of the channel transfer function is exploited. Also in this case, the computational costs are other than negligible.

Another technique regarding estimation of the RMS-DS $\tau_{rms}$ is proposed in the publication Wu S., Bar-Ness Y., "*OFDM Channel Estimation in the presence of frequency offset and phase noise*", IEEE International Conference on Communications, ICC '03, Volume 5, May 11-15, 2003, and envisages using an iterative technique for the search for the optimal length of the channel delay profile. The technique comprises seeking the support of the channel delay profile (which is proportional to the delay spread) increasingly from 1 to the length of the cyclic prefix of the OFDM symbol. At each iteration, two conditions are verified, which compare the improvement obtained in the estimation of the delay profile with respect to the previous iteration. The length of the support is determined from the outcome of the two comparisons. The latency and computational costs of this approach are evident.

A method for estimating the delay-spread value is known from the publications: K. Witrisal, Y. Kim, R. Prasad, "*A new method to measure parameters of frequency-selective radio channels using power measurements*", IEEE Transactions on Communications, vol. 49, No. 10, October 2001; and K. Witrisal, "*On estimating the RMS Delay Spread from the frequency domain level crossing rate*", 2001, IEEE Comm. Letters, Vol. 5, No. 7, pp. 3366-3370. Said method is based upon the proportionality between the density of crossings of the envelope of the channel transfer function with a pre-selected level and the RMS-DS $\tau_{rms}$ itself. The method described in the above documents has been developed in a context of statistical characterization of radio channels in order to provide designers of wireless telecommunications systems with realistic channel models. Said method, however, involves pre-selecting an adequate level and is sensitive to noise.

BRIEF SUMMARY OF THE INVENTION

One embodiment of the present invention provides a solution capable of performing the functions described previously in a simpler manner, with low computational cost and with low sensitivity to noise.

According to an embodiment of the present invention, the above purpose is achieved by a method having the characteristics described herein. Embodiments of the invention also relate to the corresponding apparatus, as well as to a computer-program product directly loadable into the memory of a computer and comprises software code portions for performing the method when the product is run on a computer.

A solution according to one embodiment of the invention envisages estimating the delay spread of a channel with memory, starting from the mean number of zero crossings of the real part and of the imaginary part of the channel transfer function itself.

As compared to the known solutions, the solution proposed herein has the advantage of being extremely simple and particularly effective when associated with systems with modulation of an OFDM type, where a preliminary estimate of the channel transfer function is usually available. From this, it is possible to determine the delay spread and subsequently proceed to a more reliable channel estimation thanks to the reduction in the number of unknown parameters.

BRIEF DESCRIPTION OF THE SEVERAL VIEWS OF THE DRAWINGS

Embodiments of the invention will now be described, purely by way of one or more non-limiting examples, with reference to the annexed drawings, in which.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The embodiment(s) of the method proposed envisages estimating the delay spread of a channel with memory on the basis of the mean number of zero crossings of the real part and imaginary part of the transfer function of said channel.

Described in what follows is the construction of the estimator used in the method, in the condition of absence of noise.

As demonstrated in Papoulis A., "*Probability, Random Variables and Stochastic Processes*", McGraw-Hill, Third Edition, the square of a density of crossings λ of a random Gaussian process with zero mean with a level a, if said level a corresponds to zero, is equal to:

$$\lambda_0^2 = \frac{-R''(0)}{\pi^2 R(0)} = \frac{\int_{-\infty}^{+\infty} \omega^2 S_x(\omega) \delta\omega}{\pi^2 \int_{-\infty}^{+\infty} S_x(\omega) \delta\omega} \quad (5)$$

Designated in what follows by $\lambda_0$ will hence be a density of zero crossings.

The development of an estimator for the RMS-DS τhd rms is based upon Equation (5). The process whereof the density of zero crossings can be calculated is the channel frequency response H(f). It can be shown that the power spectral density $S_H(\omega)$ of the process having a frequency response H(f) is:

$$S_H(\omega) = \sum_{i=0}^{L-1} E[|h_i|^2]\delta(\tau_i + \omega) \quad (6)$$

namely, said spectral density $S_H(\omega)$ is represented by the delay profile with the axis of the delays τ reversed, as can be readily noted from a comparison between Equation (6) and Equation (3).

Typically a delay profile has a decreasing exponential behavior, as shown by the following expression:

$$|h(\tau)|^2 = \frac{1}{\tau_{rms}} e^{-\frac{\tau}{\tau_{rms}}} \quad (7)$$

As demonstrated by Equation (6), the delay profile coincides with the power spectral density expressed in the frequency domain.

There can now be applied to this case Equation (5), to obtain for the square $\lambda_0^2$ of a density of crossings $\lambda$ with the zero level:

$$\lambda_0^2 = \frac{\int_0^\infty \omega^2 \cdot \frac{1}{\tau_{rms}} \cdot e^{-\frac{w}{2\pi\tau_{rms}}} d\omega}{\pi^2 \int_0^\infty \frac{1}{\tau_{rms}} \cdot e^{-\frac{w}{2\pi\tau_{rms}}} d\omega} = 8\tau_{rms}^2 \quad (8)$$

By inverting Equation (8) the following expression for the RMS-DS $\tau_{rms}$ can be obtained:

$$\tau_{rms} = \frac{1}{\sqrt{8}} \lambda_0 \quad (9)$$

It may be noted that the process H(f) is, in general, complex; consequently, two independent measurements of density of zero crossings $\lambda_0$ can be obtained considering separately the real part and the imaginary part of said process H(f).

Designated by $\lambda_{0re}$ is hence the density of zero crossings corresponding to the real part of the process H(f), whilst designated by $\lambda_{0im}$ is the density of zero crossings for the imaginary part of the process H(f).

The final estimation of the RMS-DS $\tau_{rms}$ is obtained by taking the mean of said two densities of zero crossings:

$$\tau_{rms} = \frac{1}{\sqrt{8}} \left( \frac{\lambda_{0re} + \lambda_{0im}}{2} \right) \quad (10)$$

Described hereinafter is the construction of the estimator used in the method, considering, however, the effect of the noise present on the frequency response H(f).

The density of zero crossings $\lambda_0$ measured is in fact greater on account of the presence of the noise. Consequently, the estimator obtained previously according to Equation (10) would yield an overestimate of the value of RMS-DS $\tau_{rms}$.

If the noise is not correlated to the signal, its power spectral density $S_N(\omega)$ is added to the one already calculated in Equation (6), to obtain a power spectral density $S(\omega)$:

$$S(\omega) = S_H(\omega) + S_N(\omega) \quad (11)$$

Assuming a white Gaussian noise with variance $\sigma_N^2$ the power spectral density of the noise $S_N(\omega)$ is constant.

It is assumed moreover that both the delay profile and the noise are low-pass filtered in the domain r to eliminate a part of noise via a filter $H_{filter}(\tau)$ with constant response up to $\tau = \tau_{MAX}$, which is the maximum allowable length of the delay profile.

With these assumptions, it is possible to recalculate the density of zero crossings:

$$\lambda_0^2 = \frac{\int_{-\infty}^{+\infty} \omega^2 S(\omega) d\omega}{\pi^2 \int_{-\infty}^{+\infty} S(\omega) d\omega} = \quad (12)$$

$$\frac{\int_{-\infty}^{+\infty} \omega^2 (S_H(\omega) + S_N(\omega)) d\omega}{\pi^2 \int_{-\infty}^{+\infty} (S_H(\omega) + S_N(\omega)) d\omega} = \frac{2 \cdot SNR \cdot I_H^{(2)} + I_N^{(2)}}{\pi^2 (2 \cdot SNR \cdot I_H^{(0)} + I_N^{(0)})}$$

where:

$$SNR = \frac{\sigma_H^2}{\sigma_N^2} \quad (13)$$

$$I_H^{(n)} = \int_{-\infty}^{+\infty} \omega^n S_H(\omega) |H_{filter}(\omega)|^2 d\omega \quad (14)$$

$$I_N^{(n)} = \int_{-\infty}^{+\infty} \omega^n |H_{filter}(\omega)|^2 d\omega \quad (15)$$

On account of how the filter $H_{filter}(\tau)$ is constructed, it may be assumed that $I_H^{(0)} = 1$.

By inverting Equation (12) and assuming available a measurement of the density of zero crossings $\lambda_0$ calculated as in Equation (10), the following relation for estimation of the RMS-DS $\tau_{rms}$ is obtained:

$$\hat{I}_H^{(2)} = \hat{\lambda}_0^2 \cdot \pi^2 - \frac{I_N^{(2)} - \hat{\lambda}_0^2 \cdot \pi^2 \cdot I_N^{(0)}}{2 \cdot SNR} \quad (16)$$

The second term of Equation (16) represents a corrective factor that takes into account the contribution of noise on the calculation of zero crossings. The term is proportional to the inverse of the signal-to-noise ratio SNR.

It is now possible to calculate the RMS-DS $\tau_{rms}$ as $$\tau_{rms} = \frac{1}{\pi} \cdot \sqrt{\frac{\hat{I}_H^{(2)}}{8}} \quad (17)$$

It is clear that the extension of the proposed method just described to delay profiles of other forms is to be considered as readily deducible from the one just described.

It may be noted that, in general, the exact shape of the delay profile is not known. It is, however, reasonable to assume in the case of channels with memory of a wireless type a distribution of an exponential type. Each time, according to the information a priori on the channel, it will be useful to assume the most appropriate form of the PDP. It should be noted that for the cases of interest, a direct proportionality between the RMS-DS $\tau_{rms}$ and the density of zero crossings is always found.

The embodiment(s) of the method described above has a practically negligible complexity and can hence be exploited in particular in telecommunications systems with a modulation of an OFDM type, such as for example the U.S. WLAN standard IEEE 802.11a and the European WLAN standard HyperlanII.

Briefly described hereinafter is an example structure of an OFDM telecommunications system in order to clarify to which part of the system the method and apparatus according to embodiments of the invention are applied and how they achieve their technical effect.

In OFDM modulation a high-bitrate data flow is split into a number of lower-bitrate flows, which are transmitted in parallel on a number of subcarriers that are orthogonal to one another. An available band B is thus split into an integer number N of equispaced subcarriers that are orthogonal to one another as long as the following condition is respected as regards their spacing in frequency $\Delta f$:

$$\Delta f = \frac{B}{N} = \frac{1}{T_s} \quad (18)$$

where $T_S$ indicates the duration of the OFDM symbol.

Said condition can be readily obtained via an inverse discrete Fourier transform. The number N of subcarriers is chosen normally as a power of two, so as to enable use of efficient implementations of the direct Fourier transform (Fast Fourier Transform—FFT) and of said inverse Fourier transform (Inverse Fast Fourier Transform—IFFT). The introduction of a cyclic prefix "periodicizes" the signal transmitted, rendering the system robust in regard to the delay spread introduced by the radio channel.

The data flow that it is to be transmitted is modulated through the classical modulations (PSK, QPSK or QAM) to obtain a sequence of complex numbers $d_k$. Via an inverse transform of an IFFT type, a signal in the time domain x[n] is obtained:

$$x[n] = \frac{1}{N} \sum_{k=0}^{N-1} d_k e^{j\frac{2\pi kn}{N}} \quad n = 0, 1, \ldots, N-1 \quad (19)$$

Figure 1:
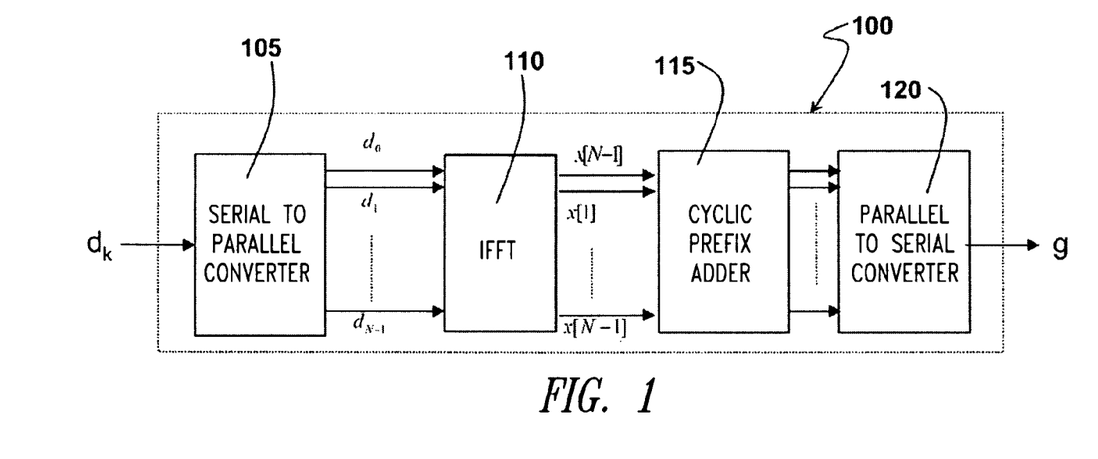
FIG. 1 shows an OFDM transmitter designed to implement one embodiment of the method according to the invention.

Before performing transmission, there is set in front of each symbol the last part of the symbol itself (cyclic prefix) so as to prevent introduction of intersymbol interference and guarantee orthogonality between the subcarriers. Reference in this regard may be made to FIG. 1, which shows an OFDM transmitter, designated as a whole by the reference number 100, which comprises a serial-to-parallel converter 105, which receives at input the sequence of complex numbers $d_k$ and supplies it in parallel to a block 110, which symbolically represents an IFFT operation, designed to generate at output in parallel the N symbols of the signal in the time domain x[n], added to which, in a block for addition of the cyclic prefix 115, is the last part of the symbol itself. At output from the block for addition of the cyclic prefix 115 there is then set a parallel-to-serial converter 120 for serializing the sequence to be transmitted g.

The receiver for an OFDM system, after determining the synchronization point, eliminates the cyclic prefix and executes the discrete Fourier transform on the N remaining samples y[n] to obtain a received signal:

$$Y[k] = \sum_{n=0}^{N-1} y[n] e^{-j\frac{2\pi kn}{N}} = H(k) \cdot d_k + n(k) \quad k = 0, 1, \ldots N-1 \quad (20)$$

Figure 2:
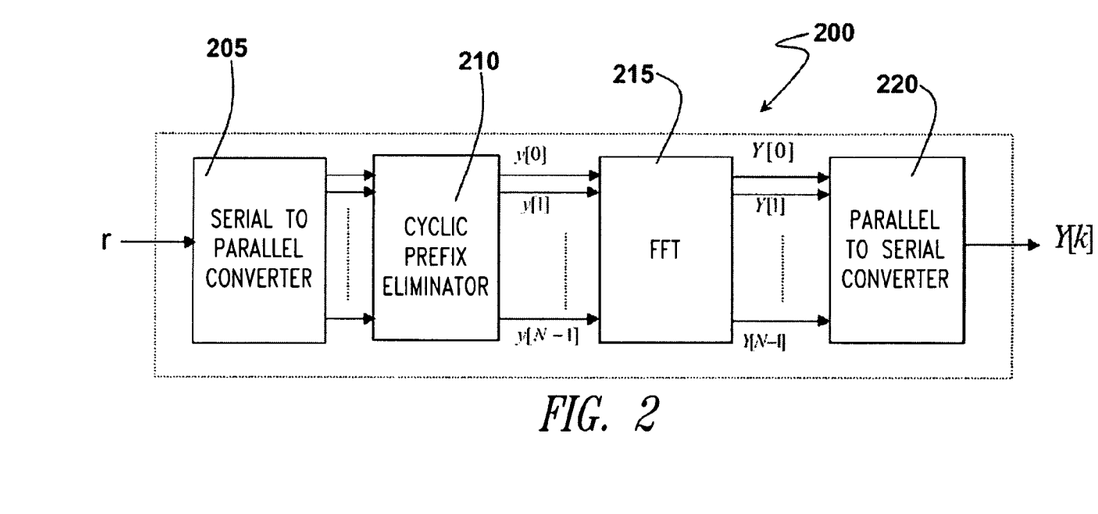
FIG. 2 shows an OFDM receiver designed to implement the procedure of channel estimation according to an embodiment of the invention.

Accordingly, FIG. 2 shows an OFDM receiver, designated as a whole by the reference number 200, which converts a demodulated received sequence r from serial into parallel in a corresponding serial-to-parallel converter 205 and eliminates the cyclic prefix thereof from the symbols in a module for elimination of the cyclic prefix 210, so producing the N samples y[0] ... y[N−1] of the received sequence, which are transformed, in a block 215 which carries out the FFT, into the coefficients Y[0] ... Y[N−1] of the received signal Y[k]. Then, a parallel-to-serial converter 220 produces the received signal Y[k]. Said received signal Y[k], but for the noise, is equal to the desired signal multiplied by the frequency response of the channel. The distorting effect of the radio channel can be conveniently removed in the frequency domain provided that a reliable channel estimate is available.

One example embodiment of the method proposed in OFDM telecommunications systems hence finds application mainly in the context of channel estimation.

There will now be described an embodiment of an estimator according to the method proposed in WLAN systems operating according to the standard IEEE 802.11a and with OFDM modulation. Said systems envisage packet transmission. The data part is preceded by a preamble known to the receiver, said preamble being useful for estimating some parameters of the channel, among which the frequency response.

Figure 3:
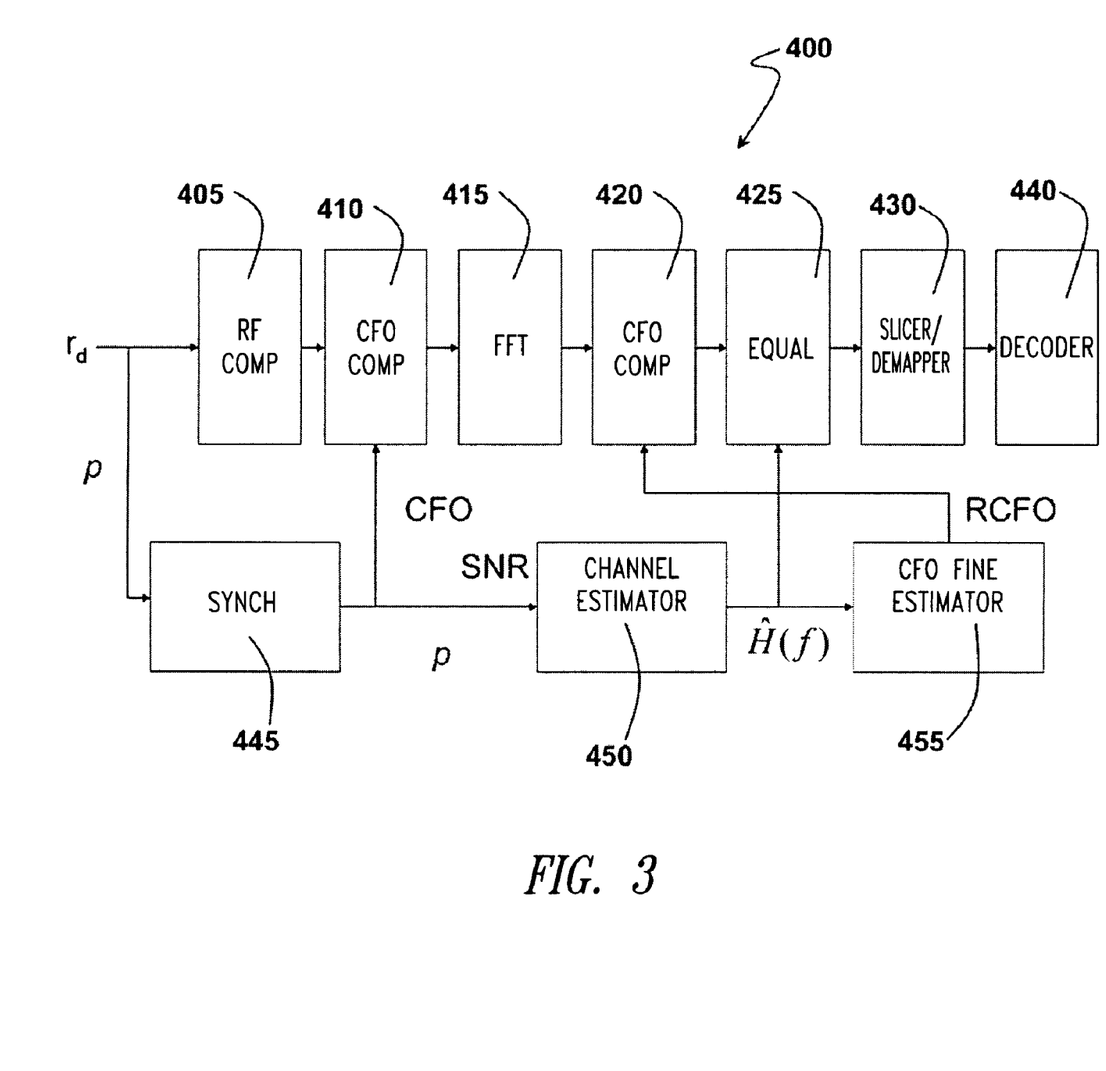
FIG. 3 represents an embodiment of the receiver of FIG. 2.

A simplified scheme of a digital section, designated by the reference number 400, of an IEEE 802.11a WLAN receiver is represented in FIG. 3, where the reference number 405 designates a module for compensation of RF defects, said module receiving digital data $r_d$ from an analog-to-digital converter (not shown in the figure) and supplies its output to a module for compensation of the carrier-frequency offset (CFO) 410. In this way, the signal is cleaned from the distortions due to the RF stages. Set downstream of said module 410 is a module 415 for performing an FFT operation, which is followed by a module 420 for CFO compensation in the frequency domain, and by an equalizer 425, which supplies an equalized signal. The equalized signal is demodulated, and the likelihoods of the individual bits are extracted in a slicing and demapping block 430 and finally is a Viterbi decoder 440.

At the same time, preambles p taken from the digital data $r_d$ by the analog-to-digital converter are moreover sent in parallel to the input of a module 445 for synchronization, CFO estimation, and estimation of the signal-to-noise ratio (SNR). The CFO estimate is supplied to the module for CFO compensation 410, whilst the SNR estimate is supplied to a channel-estimator block 450 together with the preambles p. Said channel-estimator block 450 supplies at output an estimate of the channel $\hat{H}(f)$, which is sent to the equalizer 425 and to a module for fine estimation of the CFO 455. Said module for fine estimation of the CFO 455 provides information on a residual carrier-frequency offset (RCFO) to the module 420 for its compensation in the frequency domain. The equalizer 425 compensates the distortions due to the transmission channel thanks to the estimation of the channel transfer function produced by the channel-estimator block 450. From the signals equalized the likelihoods of the transmitted bits are extracted by block 430. These are sent to the Viterbi decoder 440, which supplies the transmitted data.

Figure 4:
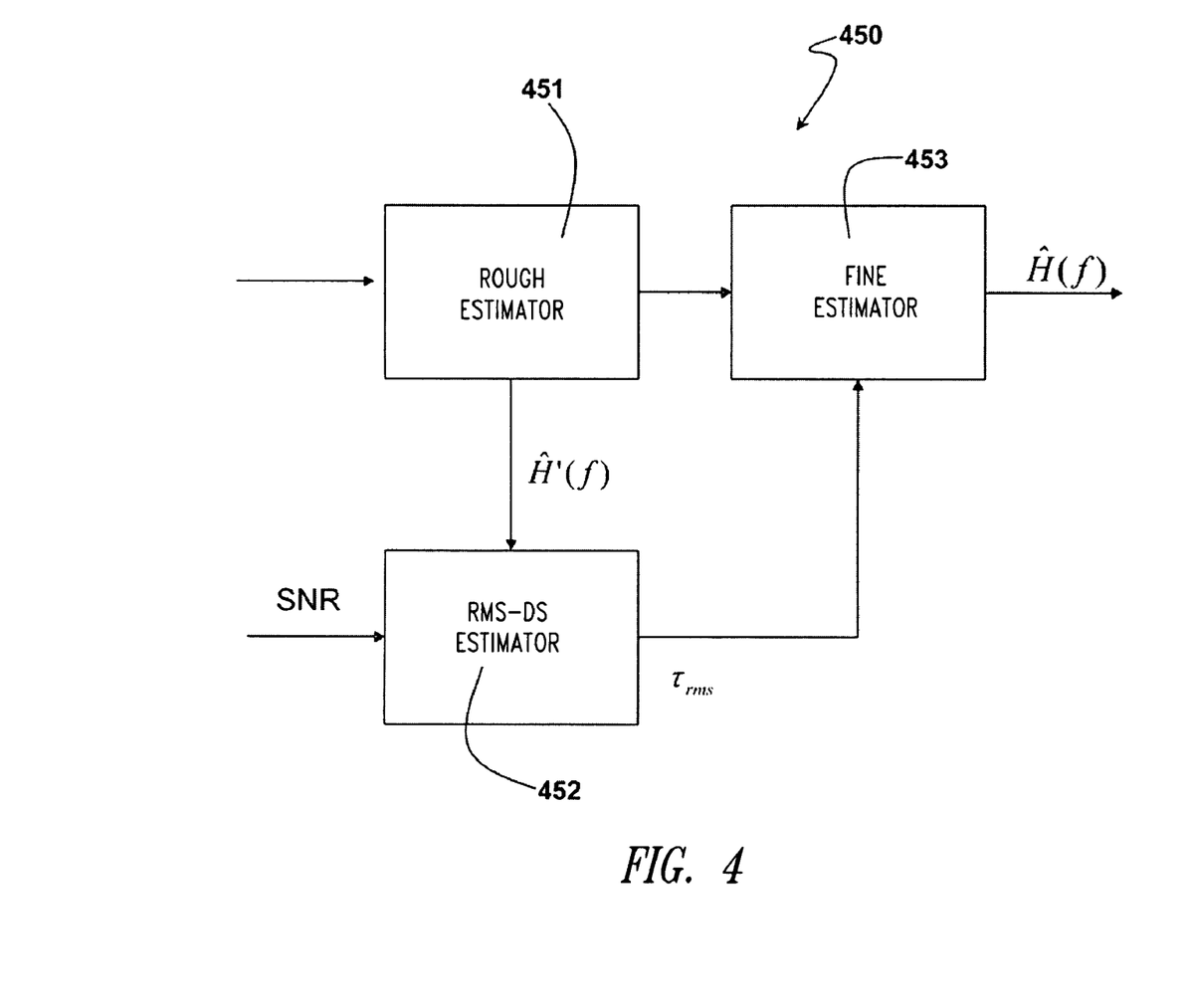
FIG. 4 represents a detail of the embodiment of FIG. 3.

The channel-estimator block 450 is represented in greater detail in FIG. 4 and comprises a first block 451, which executes a first rough estimation $\hat{H}'(f)$ of the channel frequency response by demodulating the signal received at the preamble (maximum-likelihood or ML estimation). If there is available a first rough estimate $\hat{H}'(f)$ of the channel frequency response, it is possible to evaluate, in a block for estimation of the RMS-DS 452, the estimate of the RMS-DS $\tau_{rms}$, as described previously with reference to Equation (17). Once the estimate of the RMS-DS $\tau_{rms}$ has been obtained, in an fine-channel-estimation block 453 further processing can be performed on the estimate $\hat{H}'(f)$ to obtain a more reliable estimate $\hat{H}(f)$.

The solution just described enables considerable advantages to be achieved with respect to known solutions.

The embodiment(s) of the method proposed advantageously envisages estimating the delay spread of a channel with memory, starting from the mean number of zero crossings of the real part and imaginary part of the transfer function of said channel. Said solution presents the advantage of being extremely simple if compared with the solutions that use the density of crossings, with a pre-selected level, of a characteristic curve of the channel transfer function, said characteristic curve being represented by the envelope of the transfer function itself instead of by its real and imaginary parts, as in the method proposed. In fact, the embodiment(s) of the proposed method in this way advantageously does not involve having, in the first place, to pre-select a threshold level with respect to which the crossings are to be calculated, and in the second place it is advantageously able to eliminate any possible biasing of the measurement due to the presence of noise. The separate analyses of the real and imaginary parts enable two observations of the same physical quantity, which inevitably leads to an improvement of the measurement via a simple averaging operation.

The embodiment(s) of the method proposed is moreover particularly advantageous when implemented in a channel estimator in the framework of an OFDM system.

It may moreover be noted that in OFDM systems, the most widespread method of estimation of the delay spread requires singular-value decomposition of the matrix or at least an estimation of the rank of the autocorrelation matrix of the channel transfer function. Both of the options are considerably more complex than one embodiment of the method and apparatus according to the present invention.

Of course, without prejudice to the principle of the invention, the details of implementation and the embodiments may vary widely with respect to what is described and illustrated herein, without thereby departing from the scope of the present invention, as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other changes can be made in light of the above-detailed description. In general, in the following claims, the terms used should not be construed to be limiting to the specific embodiments disclosed in the specification and the claims, but should be construed to include all systems, devices and/or methods that operate in accordance with the claims. Accordingly, the invention is not limited by the disclosure, but instead its scope is to be determined entirely by the following claims.

What is claimed is:

1. A method for executing, as a function of a received signal, a procedure of channel estimation of a transmission channel with memory in a telecommunications system, the method comprising:
   estimating a delay spread associated to said channel, said estimating the delay spread including calculating a root mean square value of delay spread by evaluating crossings with a threshold level of a characteristic curve of a transfer function representing said channel, said evaluating of crossings including evaluating a first number of crossings, corresponding to a real part of said transfer function, and a second number of crossings, corresponding to an imaginary part of said transfer function, with the threshold level corresponding to a zero level;
   applying a mean operation to said first number of crossings and said second number of crossings, to obtain a mean number of crossings, wherein said telecommunications system operates according to an OFDM modulation;
   obtaining a value of rough estimation of the channel by demodulating the received signal; and
   supplying said root mean square value of delay spread to an operation involving fine channel estimation.

2. The method according to claim 1 wherein said root mean square value of delay spread is obtained, via a relation of direct proportionality, from said mean number of crossings.

3. The method according to claim 1, further comprising:
   calculating said root mean square value of delay spread according to said value of rough estimation of the channel.

4. The method according to claim 1 wherein said telecommunications system is a system of a wireless type, including an IEEE 802.11a WLAN standard or an HyperlanII WLAN standard.

5. An apparatus for performing, as a function of a received signal, a channel estimation in a transmission channel with memory in a telecommunications system, the apparatus comprising:
   a module configured to estimate a delay spread associated to said channel, by calculating a root mean square value of delay spread by evaluating crossings with a threshold level of a quantity associated to a transfer function representing said channel, said module is configured to perform said evaluation of crossings by evaluating a first number of crossings, corresponding to a real part of said transfer function, and a second number of crossings, corresponding to an imaginary part of said transfer function, with the threshold level corresponding to a zero level, and said module further being configured to apply a mean operation on said first number of crossings and said second number of crossings to obtain a mean number of crossings;
   a first module configured to calculate a value of rough estimation of the channel by demodulating the received signal; and
   a second module of fine channel estimation that receives said root mean square value of delay spread.

6. The apparatus according to claim 5 wherein said module configured to estimate the delay spread associated to said channel is configured to calculate said root mean square value of delay spread via a relation of direct proportionality from said mean number of crossings.

7. The apparatus according to claim 5, wherein the first module is further configured to supply said value of rough estimation to said module configured to estimate a delay spread as a function of said value of rough estimation.

8. The apparatus according to claim 5 wherein the module comprises part of a receiver for OFDM telecommunications systems.

9. The apparatus according to claim 5 wherein said module comprises part of a receiver of a wireless telecommunications system, including a receiver compatible with an IEEE 802.11a WLAN standard or a HyperlanII WLAN standard.

10. A computer-readable medium including contents that, when loaded into a memory of a computer, cause the computer to implement a method comprising:

estimating a delay spread associated to a channel according to a root mean square value of delay spread based on crossings of a characteristic curve of a transfer function representing a channel, at least some of the crossings being associated with a threshold level;

evaluating a first number of crossings, corresponding to a real part of the transfer function, and a second number of crossings, corresponding to an imaginary part of said transfer function, with the associated threshold level of the crossings corresponding to a zero level; and applying a mean operation, to the first number of crossings and to the second number of crossings, to obtain a mean number of crossings;

obtaining a value of rough estimation of the channel by demodulating a received signal; and supplying the root mean square value of delay spread to an operation involving fine channel estimation.

11. The computer-readable medium of claim 10 wherein the method includes determining the root mean square value of delay spread from the mean number of crossings using a direct proportionality relation.

12. The computer-readable medium of claim 10 wherein the method includes:
determining said root mean square value of delay spread according to the value of rough estimation of the channel.

13. A system to perform channel estimation of a communication channel, the system comprising:
a module adapted to estimate a delay spread associated with the channel according to a root mean square value of delay spread, the root mean square value of delay spread being based on crossings with a threshold level of a quantity associated with a transfer function representing the channel, wherein the module is adapted to evaluate the crossings by evaluating a first number of crossings, corresponding to a real part of the transfer function, and a second number of crossings, corresponding to an imaginary part of the transfer function, with the threshold level of the crossings corresponding to a zero level, and wherein the module is further adapted to apply a mean operation on the number of crossings and on the second number of crossings to obtain a mean number of crossings that can be used to estimate the delay spread associated with the channel; and a first unit to obtain a value of rough estimation of the channel by demodulating a received signal;

a second unit communicatively coupled to the first unit to determine the root mean square value of delay spread; and a third unit coupled to the second unit to perform fine channel estimation based on the root mean square value of delay spread.

14. The system of claim 13 wherein the module is adapted to estimate the delay spread associated with the channel, using the mean number of crossings, based on a direct proportionality relation.

15. The system of claim 13,
wherein the second unit is communicatively coupled to the first unit to determine the root mean square value of delay spread according to the value of rough estimation of the channel obtained by the first unit.

16. A method for executing, as a function of a received signal, a procedure of channel estimation of a transmission channel with memory in a telecommunications system, the method comprising:

estimating a delay spread associated to said channel, said estimating the delay spread including calculating a root mean square value of delay spread by evaluating crossings with a threshold level of a characteristic curve of a transfer function representing said channel, said evaluating of crossings including evaluating a first number of crossings, corresponding to a real part of said transfer function, and a second number of crossings, corresponding to an imaginary part of said transfer function, with the threshold level corresponding to a zero level; and applying a mean operation to said first number of crossings and said second number of crossings, to obtain a mean number of crossings, wherein said telecommunications system operates according to an OFDM modulation, wherein said root mean square value of delay spread is obtained by calculating a root mean square value of said mean number of crossings but for a corrective factor that takes into account a contribution of noise on the calculation of the crossings with said zero level, said corrective factor being proportional to an inverse of a signal-to-noise ratio.

17. An apparatus for performing, as a function of a received signal, a channel estimation in a transmission channel with memory in a telecommunications system, the apparatus comprising:
a module configured to estimate a delay spread associated to said channel, by calculating a root mean square value of delay spread by evaluating crossings with a threshold level of a quantity associated to a transfer function representing said channel, said module is configured to perform said evaluation of crossings by evaluating a first number of crossings, corresponding to a real part of said transfer function, and a second number of crossings, corresponding to an imaginary part of said transfer function, with the threshold level corresponding to a zero level, and said module further being configured to apply a mean operation on said first number of crossings and said second number of crossings to obtain a mean number of crossings, and said module further being configured to calculate said root mean square value of delay spread by calculating a root mean square value of said mean number of crossings but for a corrective factor that takes into account a contribution of noise on the calculation of the crossings with said zero level, said corrective factor being proportional to an inverse of a signal-to-noise ratio of the channel.

18. A computer-readable medium including contents that, when loaded into a memory of a computer, cause the computer to implement a method comprising:
estimating a delay spread associated to said channel according to a root mean square value of delay spread based on crossings of a characteristic curve of a transfer function representing a channel, at least some of the crossings being associated with a threshold level;

evaluating a first number of crossings, corresponding to a real part of the transfer function, and a second number of crossings, corresponding to an imaginary part of said transfer function, with the associated threshold level of the crossings corresponding to a zero level;

applying a mean operation, to the first number of crossings and to the second number of crossings, to obtain a mean number of crossings; and determining the root mean square value of delay spread by calculating a root mean square value of the mean number of crossings, along with a corrective factor to account for noise contribution.

19. A system to perform channel estimation of a communication channel, the system comprising:

a module adapted to estimate a delay spread associated with the channel according to a root mean square value of delay spread, the root mean square value of delay spread being based on crossings with a threshold level of a quantity associated with a transfer function representing the channel, wherein the module is adapted to evaluate the crossings by evaluating a first number of crossings, corresponding to a real part of the transfer function, and a second number of crossings, corresponding to an imaginary part of the transfer function, with the threshold level of the crossings corresponding to a zero level, wherein the module is further adapted to apply a mean operation on the number of crossings and on the second number of crossings to obtain a mean number of crossings that can be used to estimate the delay spread associated with the channel, and wherein the module is further adapted to determine the root mean square value of delay spread by calculating a root mean square value of the mean number of crossings, along with a corrective factor to account for noise contribution.

* * * * *